United States Patent
Song et al.

(10) Patent No.: US 9,491,483 B2
(45) Date of Patent: *Nov. 8, 2016

(54) INTER-PREDICTION METHOD AND VIDEO ENCODING/DECODING METHOD USING THE INTER-PREDICTION METHOD

(71) Applicant: SK TELECOM CO., LTD., Seoul (KR)

(72) Inventors: Jinhan Song, Seoul (KR); Jeongyeon Lim, Seongnam-si (KR); Jongki Han, Seoul (KR); Yunglyul Lee, Seoul (KR); Joohee Moon, Seoul (KR); Haekwang Kim, Seoul (KR); Byeungwoo Jeon, Seongnam-si (KR); Chanwon Seo, Seoul (KR); Hyoungmee Park, Suwon-si (KR); Daeyeon Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/688,461

(22) Filed: Apr. 16, 2015

(65) Prior Publication Data
US 2015/0222927 A1 Aug. 6, 2015

Related U.S. Application Data

(63) Continuation of application No. 14/688,062, filed on Apr. 16, 2015, which is a continuation of application No. 13/641,670, filed as application No. PCT/KR2011/002545 on Apr. 12, 2011, now Pat. No. 9,094,690.

(30) Foreign Application Priority Data

Apr. 16, 2010 (KR) .................. 10-2010-0035222
Dec. 16, 2010 (KR) .................. 10-2010-0129059

(51) Int. Cl.
*H04N 7/12* (2006.01)
*H04N 19/577* (2014.01)
(Continued)

(52) U.S. Cl.
CPC .......... *H04N 19/577* (2014.11); *H04N 19/433* (2014.11); *H04N 19/573* (2014.11); *H04N 19/58* (2014.11)

(58) Field of Classification Search
CPC .. H04N 19/105; H04N 19/423; H04N 19/44; H04N 19/46; H04N 19/58; H04N 19/172; H04N 19/176; H04N 19/573; H04N 19/577
See application file for complete search history.

(56) References Cited

U.S. PATENT DOCUMENTS 7,889,788 B2 2/2011 Toma et al.
7,889,792 B2 2/2011 Dumitras et al.
(Continued)

FOREIGN PATENT DOCUMENTS

| | | |
|---|---|---|
| CN | 101389034 A | 3/2009 |
| KR | 1020070032111 A | 3/2007 |
| KR | 1020070096979 A | 10/2007 |
| KR | 1020080084890 A | 9/2008 |

OTHER PUBLICATIONS

International Search Report mailed Dec. 27, 2011 for PCT/KR2011/002545.
(Continued)

*Primary Examiner* — Nhon Diep
(74) *Attorney, Agent, or Firm* — Hauptman Ham, LLP

(57) ABSTRACT

A video encoding method using inter-prediction, includes: encoding information indicating whether a first picture is a picture which allows a second picture preceding the first picture in a display order to refer to at least one picture encoded before the first picture, wherein the first picture serves as a random access picture; encoding the first picture without referring to a reference picture which has already encoded; and when the first picture is a picture which allows the second picture to refer to the at least one picture encoded before the first picture, inter-prediction encoding, after encoding the first picture, the second picture by using at least one reference picture encoded before the first picture, and encoding reference picture information used for encoding the second picture, wherein the at least one reference picture encoded before the first picture is not deleted from a memory until the second picture are encoded.

4 Claims, 15 Drawing Sheets

(51) Int. Cl.
*H04N 19/433* (2014.01)
*H04N 19/573* (2014.01)
*H04N 19/58* (2014.01)

(56) References Cited

U.S. PATENT DOCUMENTS

| | | |
|---|---|---|
| 8,194,751 B2 | 6/2012 | Notoya et al. |
| 8,416,859 B2 | 4/2013 | Rodriguez et al. |
| 2005/0147167 A1 | 7/2005 | Dumitras et al. |
| 2008/0192830 A1 | 8/2008 | Ahn |
| 2014/0133577 A1* | 5/2014 | Lim ............... H04N 21/23406 375/240.25 |

OTHER PUBLICATIONS

European Search Report for application No. EP11769039 dated Sep. 9, 2013.
Chinese Office Action dated Nov. 4, 2014.

* cited by examiner

INTER-PREDICTION METHOD AND VIDEO ENCODING/DECODING METHOD USING THE INTER-PREDICTION METHOD

CROSS-REFERENCE TO RELATED APPLICATION

The present application is a continuation of U.S. patent application Ser. No. 14/688,062 filed Apr. 16, 2015, which is a continuation of U.S. patent application Ser. No. 13/641,670, filed Oct. 16, 2012, which is a National Phase application of International Application No. PCT/KR2011/002545, filed Apr. 12, 2011, which is base d upon and claims the benefit of priorities from Korean Patent Application No. 10-2010-0035222, filed on Apr. 16, 2010 and Korean Patent Application No. 10-2010-0129059, filed on Dec. 16, 2010. The disclosures of the above-listed applications are hereby incorporated by reference herein in their entirety.

TECHNICAL FIELD

The present disclosure relates to an inter-prediction method and video encoding/decoding technology using the inter-prediction method.

BACKGROUND

The statements in this section merely provide background information related to the present disclosure and do not constitute prior art.

H.264/AVC uses Instantaneous Decoding Refresh (IDR) picture for enabling an encoded bitstream to be randomly decoded from a specific time position. As illustrated in FIG. 1, an encoder deletes decoded pictures from a Decoded Picture Buffer (DPB) and clears the DPB immediately before encoding IDR picture. As in the case of the encoder, a decoder also clears a DPB immediately before decoding IDR picture.

Pictures to be encoded or decoded after the IDR picture of FIG. 1 are encoded with reference to the IDR picture and pictures encoded and decoded after the IDR picture.

An IDR picture encoding method is substantially identical to an I picture encoding method. However, the IDR picture encoding method supports a random access function that enables a decoding process to be performed from a random IDR picture time point by inserting IDR picture.

When encoding inter-pictures, H.264/AVC predicts current picture by using pictures previously encoded and decoded. As illustrated in FIG. 2, in the case of P picture, a motion estimation is performed by using a past picture existing prior to current picture on the basis of display order. A residue signal between a current block and a block determined through the motion estimation is encoded.

As illustrated in FIG. 3, in the case of B picture, a motion estimation is performed by using past picture existing prior to current picture and future picture existing after the current picture on the basis of display order. Then, a residue signal between a current block and a block determined through the motion estimation is encoded.

According to the H.264/AVC standard, one or more sheets of reference pictures can be used for inter-picture estimation with respect to each prediction direction. Due to this function, H.264/AVC exhibits superior compression performance to other picture compression standards.

H.264/AVC uses IDR picture for supporting a random access function. As illustrated in FIG. 4, an encoder and a decoder clears a DPB immediately before encoding and decoding IDR picture. Hence, the inventor(s) has noted that with respect to some of B pictures displayed before the IDR picture, bidirectional motion estimation cannot be performed during encoding, and therefore, only unidirectional motion estimation is performed. The inventor(s) has experienced that consequently, the encoding efficiency of pictures performing only the unidirectional motion estimation is reduced.

In addition, as illustrated in FIG. 5, specific P pictures displayed after the IDR picture can use only one IDR picture for the reference picture, but cannot use a plurality of pictures prior to the IDR picture for the reference picture. Therefore, the inventor(s) has experienced that the encoding efficiency of the P picture may be reduced.

SUMMARY

In accordance with some embodiments of the present disclosure, a method performed by an apparatus for encoding a video using inter-prediction, comprises: encoding information indicating whether a first picture is a picture which allows a second picture preceding the first picture in a display order to refer to at least one picture encoded before the first picture, wherein the first picture serves as a random access picture; encoding the first picture without referring to a reference picture which has already encoded; and when the first picture is a picture which allows the second picture to refer to the at least one picture encoded before the first picture, inter-prediction encoding, after encoding the first picture, the second picture by using at least one reference picture which is encoded before the first picture, and encoding reference picture information used for encoding the second picture, wherein the at least one reference picture encoded before the first picture is not deleted from a memory until the second picture are encoded.

DETAILED DESCRIPTION

Hereinafter, certain embodiments of the present disclosure will be described in detail with reference to the accompanying drawings. Some embodiments of the present disclosure provide an inter-prediction method, which is capable of solving the problems of known IDR picture used for supporting a random access and improving the encoding and decoding efficiencies, and a video encoding/decoding method using the inter-prediction method.

Figure 1:
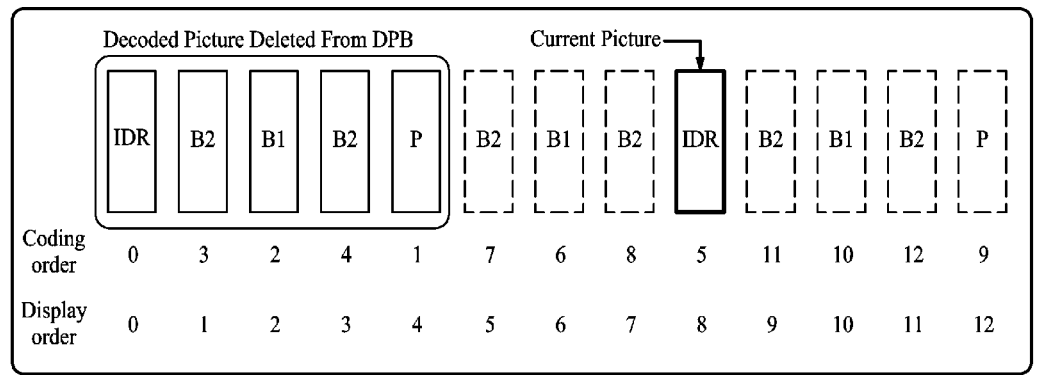
FIG. 1 is a diagram explaining known DPB management where past pictures before current picture are used for reference picture.
Figure 2:
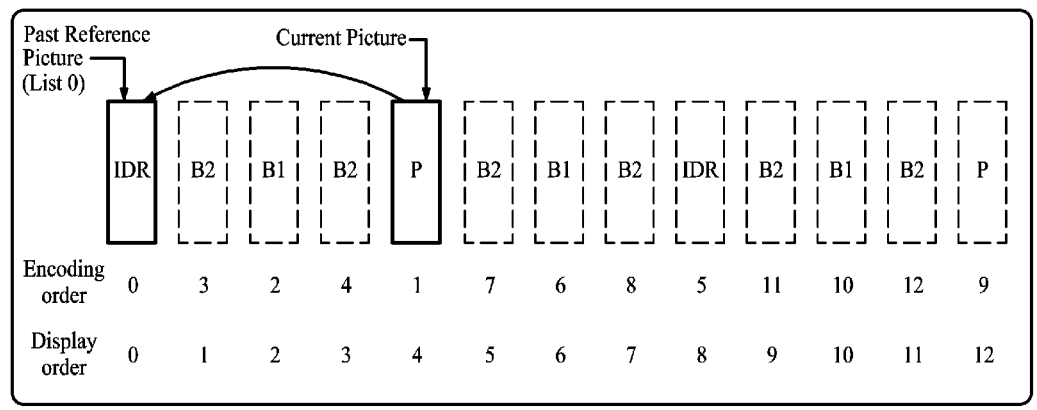
FIG. 2 is a diagram explaining a P picture prediction method.
Figure 3:
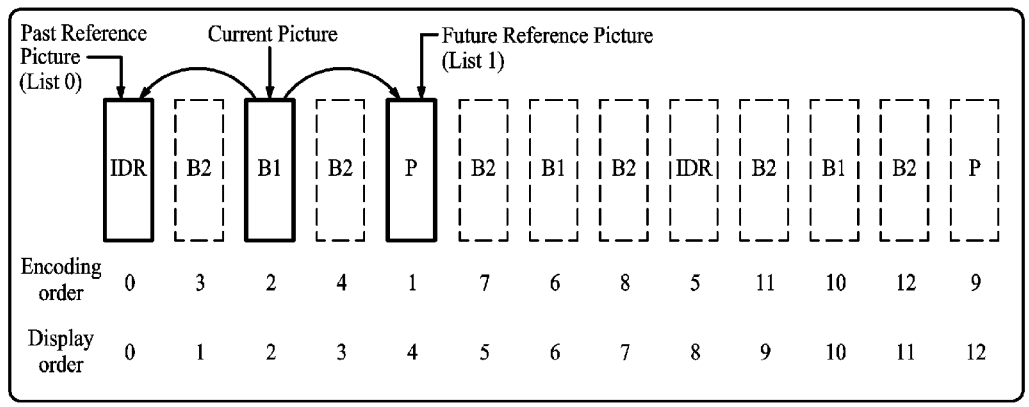
FIG. 3 is a diagram explaining a B picture prediction method.
Figure 4:
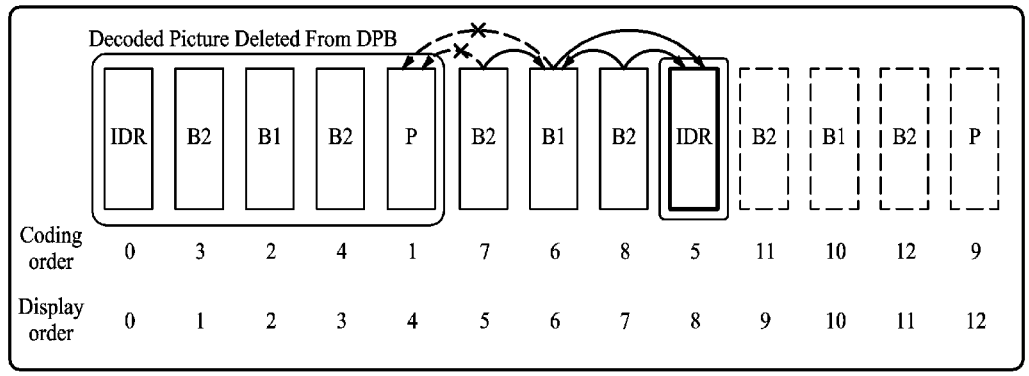
FIG. 4 is a diagram explaining problems of B picture encoding when known IDR picture is used.
Figure 5:
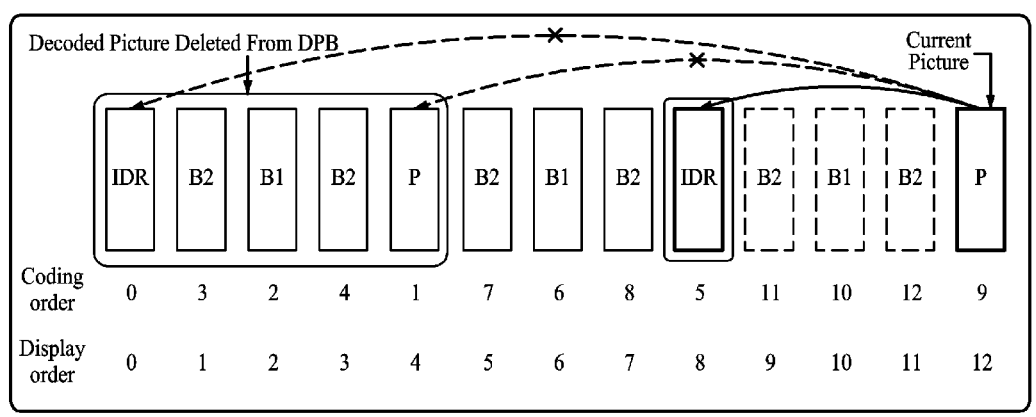
FIG. 5 is a diagram explaining problems of P picture encoding when known IDR picture is used.
Figure 6:
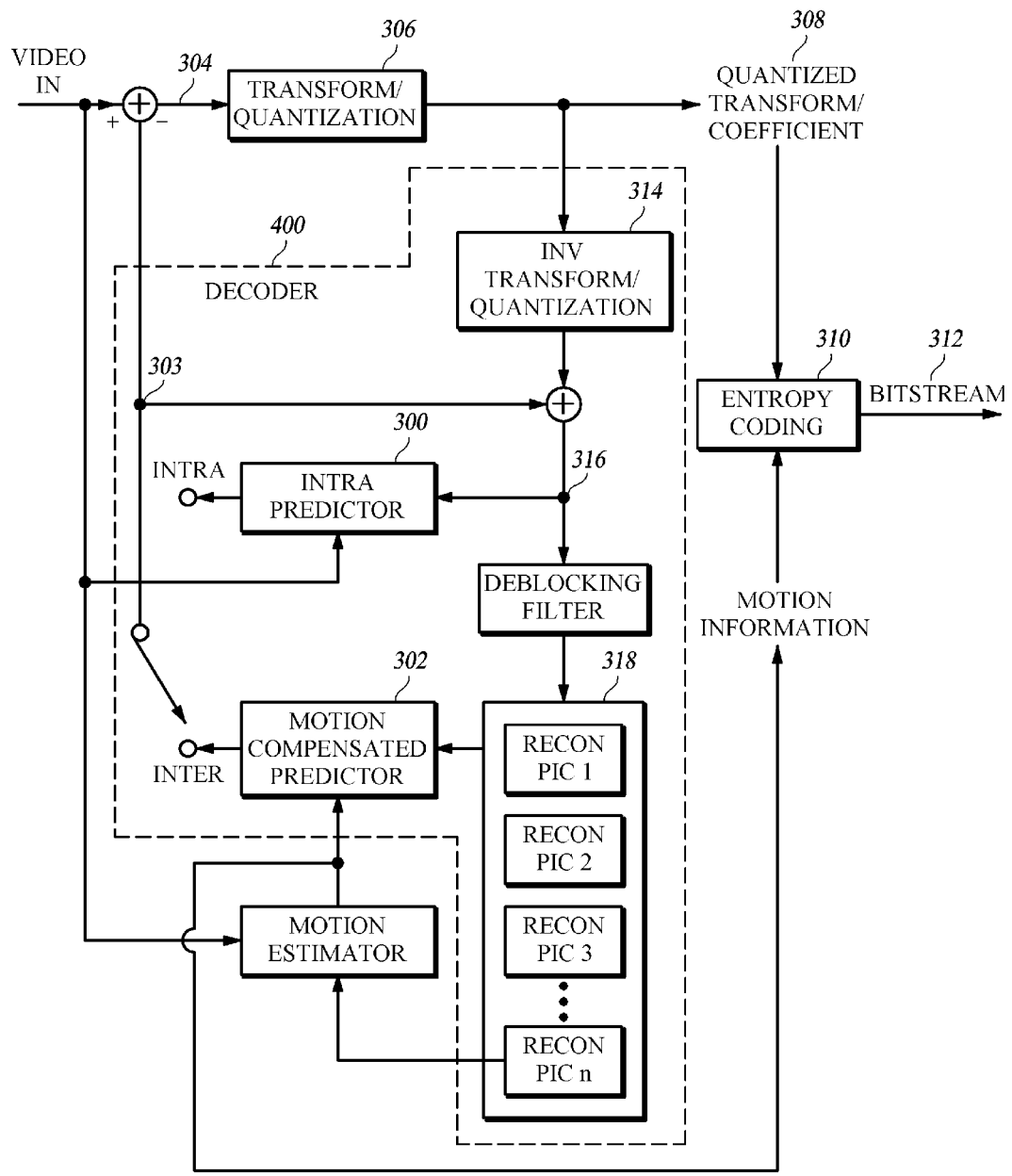
FIG. 6 is a diagram illustrating an example of an H.264 encoder and decoder according to at least one embodiment of the present disclosure.

FIG. 6 is a diagram illustrating an example of an H.264 encoder and decoder.

In a video compression standard such as H.264, pictures may be encoded as any one of I, P and B frames (or pictures). The I frame is encoded by using only a spatial correlation within a frame being currently encoded, and can be reconstructed (decoded) by using only one frame data in a decoder, without referring to other frames. The P frame is encoded by using inter-prediction referring to a reconstructed frame among frames existing in the past on the basis of display order, and a decoder can reconstruct current picture by using previously reconstructed picture. The B frame is encoded through inter-prediction using a forward reconstructed picture (list0 in H.264) and a backward reconstructed picture (list1 in H.264), and a decoder can reconstruct current picture by using the forward and backward reconstructed pictures.

Referring to FIG. 6, a video encoder performs an intra-prediction process (i.e., inter predictor) 300 or an inter-prediction process (i.e., motion compensated predictor) 302, obtains a residue 304 between current frame and predicted picture 303, and generates a bitstream 312 by performing an entropy encoding process 310 on a quantized transform coefficient 308 obtained by performing a transform/quantization process 306 on intra or inter mode information and the residue. The encoded picture is generated as reconstructed picture 316 by undergoing an inverse quantization/inverse transform process 314 and adding to the predicted picture 303, and is stored in a memory buffer (decoded picture buffer (DPB)) 318 so as to be used for reference frame of pictures to be encoded as next P or B picture. Other components of the video encoder, such as each of the intra-prediction process 300, the inter-prediction process 302, the entropy encoding process 310, the transform/quantization process 306, the inverse quantization/inverse transform process 314 is implemented by, or includes, one or more processors and/or application-specific integrated circuits (ASICs).

Referring to FIG. 6, a video decoder 400 is a part of the encoder. The video decoder 400 receives a bitstream, generates reconstructed picture 316 through the same process as a decoding loop of the encoder, and outputs the reconstructed picture 316 to a display stage such that a user views the picture. Also, the video decoder 400 stores the reconstructed picture 316 in the DPB 318 so as to be used for reference frame of pictures to be reconstructed next time.

In order to allow the decoder 400 to randomly access the picture, IDR frame (in the embodiment of the present disclosure, R frame corresponding to the IDR frame) is inserted at regular intervals whenever the encoder generates the bitstream. The IDR frame is represented as nal_unit_type 5 of a network adaptation layer (NAL) unit in the bitstream. Immediately before encoding the IDR frame, the encoder resets the DPB, and performs encoding by using only reconstructed pictures after the IDR frame, without referring to reconstructed pictures before the IDR frame, when encoding P or B frame after the IDR frame. When the encoder resets the DPB in such a manner, the decoder checks only nal_unit_type of the NAL unit on the bitstream. When nal_unit_type is the IDR frame, the decoder may reconstruct pictures by starting decoding from the IDR frame. If the decoder starts decoding from the IDR frame appearing in the middle, the decoding is started in such a state that no reconstructed pictures are stored in the DPB. Therefore, the DPB is reset from the start of encoding upon the generation of the IDR frame in consideration of the state of the decoder.

On the other hand, in the case where the encoding is performed by inserting the IDR frame so as to support the random access function, the random access is enabled in the decoder. However, as described above, the insertion of the IDR frame degrades the picture quality. The picture quality of the I frame is substantially equal to the picture quality of the IDR frame. However, the picture quality in the subsequent frames is changed due to a difference of reference pictures. The problems caused by the use of the IDR frame may be solved by the following embodiments.

In an embodiment of the present disclosure, instead of the known IDR picture, a new encoding picture type corresponding to the IDR picture is defined as refresh (R) picture, and technical details are proposed to solve the problems occurring in the known H.264/AVC. The R picture is merely the term and symbol for describing the contents of the present disclosure, and does not limit the technical contents of the present disclosure.

Figure 7:
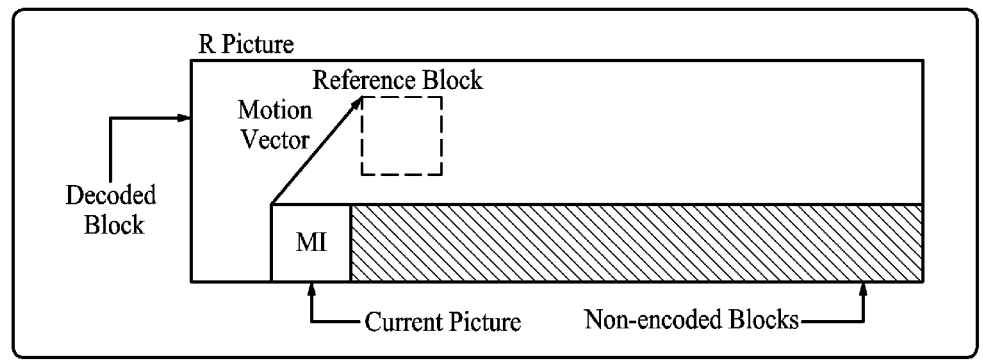
FIG. 7 is a diagram explaining an MI block prediction method according to at least one embodiment of the present disclosure.

The R picture is a picture type for supporting random access and is a reference picture for random access. That is, an encoder or a decoder may perform encoding or decoding from arbitrary R picture. To this end, as in the case of the known I picture or IDR picture, blocks constituting the R picture are generally encoded or decoded by using only intra-prediction, without using inter-prediction referring to other pictures. Alternatively, in order to increase the encoding efficiency, a moving intra (MI) block may be used as illustrated in FIG. 7.

The MI block searches blocks similar to a current block within a single picture or slice, represents position information by using a motion vector, transmits the position information, and transmits pixels of each block subtracted using Equation 1 below.

In this case, there is no limitation in using the decoded blocks as reference blocks by applying a specific interpolation filter within the current picture or slice so as to search the optimal block.

$$r_{MI} = C_{MI} - R_{MI} \qquad \text{Equation 1}$$

In Equation 1 above, CMI and RMI represent a pixel value of the current block and a pixel value of the reference block, respectively, and rMI represents a residue value obtained by subtraction of the pixel values of the two blocks. The residue signal is transmitted through a transform and quantization process. The description related to FIG. 7 is merely an exemplary embodiment for encoding the R picture. An I picture encoding method in the known H.264/AVC may be used. In this present disclosure, there is no limitation to an R picture encoding method.

The R picture proposed in the embodiment of the present disclosure efficiently manages a reference picture list, increases the encoding efficiency of pictures adjacent to the R picture in display order, and supports a random access function. In order to efficiently explain the R picture function, the terms of pictures influencing the encoding efficiency due to the use of the R picture are summarized as illustrated in FIG. 8.

Figure 8:
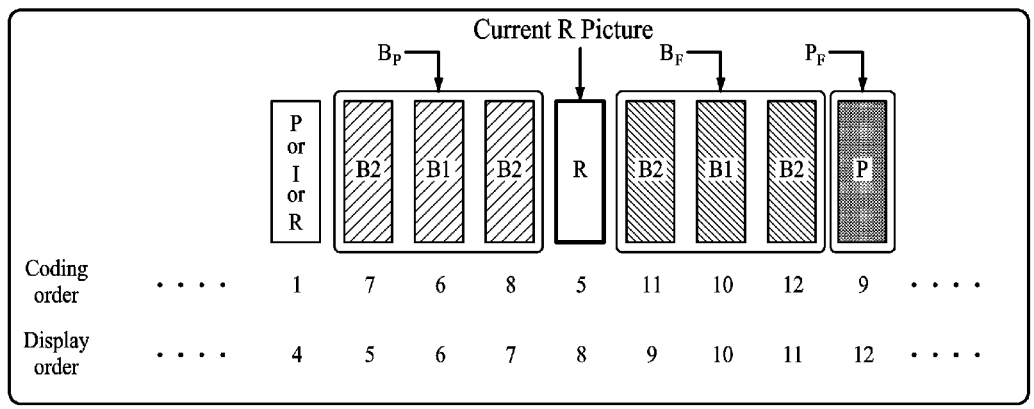
FIG. 8 is a diagram explaining an R picture function and defining terms of pictures according to at least one embodiment of the present disclosure.

In FIG. 8, B pictures existing among past P, I or R pictures closest to the current R picture in display order are defined BP, and B or P pictures existing after the R picture in display order and using the decoded current R picture as the reference picture are defined as BF and PF, respectively.

Figure 9:
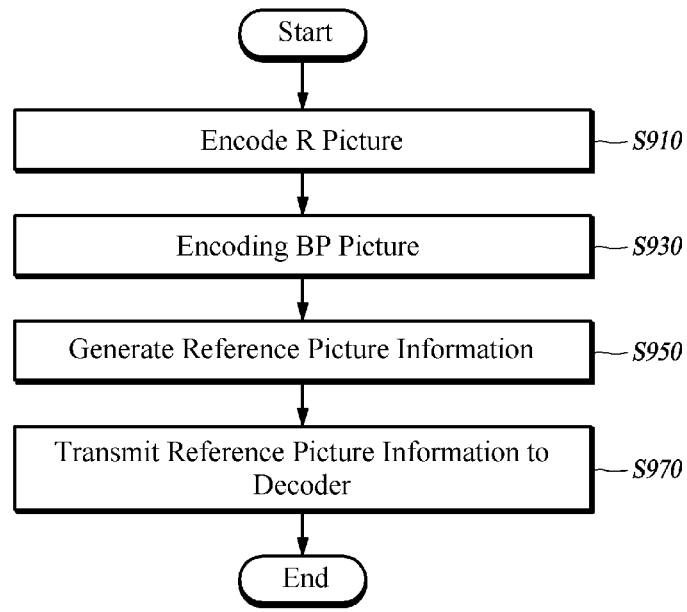
FIG. 9 is a flow chart illustrating a video encoding method using inter-prediction according to at least one first embodiment of the present disclosure.

FIG. 9 is a flow chart illustrating a video encoding method using inter-prediction according to a first embodiment of the present disclosure.

Referring to FIG. 9, R picture as a first picture, which serves as a reference for random access, is encoded (S910). A block included in B picture (for example, BP picture of FIG. 8) as a second picture, which is displayed before the R picture, is inter-prediction encoded (i.e., encoded in a manner of a inter prediction) by using a plurality of reference pictures (S930).

In addition, reference picture information is generated (S950). The reference picture information (for example, syntax of Table 1) represents whether past picture (for example, modified reference picture of the decoded R picture of FIG. 15), which is displayed before the B picture, is used as the reference picture for encoding the B picture. In step S930, when the past reference picture is used for encoding the B picture, the reference picture information may be information representing the past reference picture. In addition, in the case of using the past reference picture for encoding the B picture, at least after the encoding of the B picture, the encoder may delete reference pictures encoded before the encoding of the R picture, again decoded and then stored in a memory.

Then, as described above, the encoded R picture, the encoded B picture, and the reference picture information are transmitted to the decoder (S970).

Figure 10:
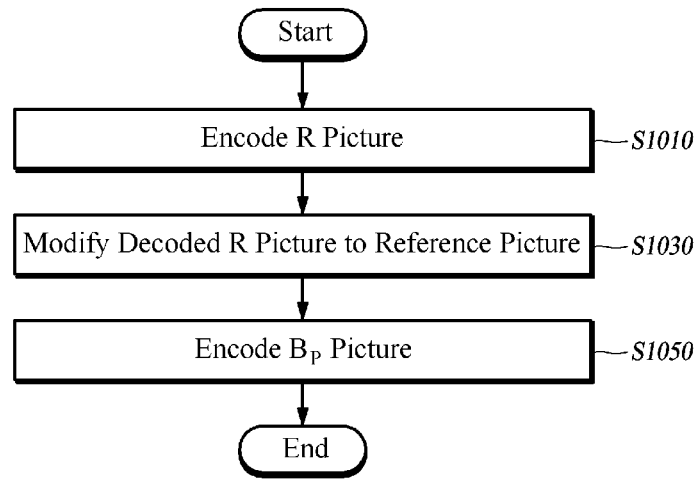
FIG. 10 is a flow chart illustrating a video encoding method using inter-prediction according to at least one second embodiment of the present disclosure.

FIG. 10 is a flow chart illustrating a video encoding method using inter-prediction according to a second embodiment of the present disclosure.

Referring to FIG. 10, R picture as a first picture, which serves as a reference for random access, is encoded (S1010). The encoded R picture is decoded, and a plurality of pictures obtained by modifying the decoded R picture is generated as reference picture (S1030).

Then, a block included in B picture (for example, BP picture of FIG. 8) as a second picture, which is displayed before the R picture, is inter-prediction encoded by using a plurality of reference pictures (S1050).

In addition, modification identification information representing a type of the modified decoded R picture is generated in step S1030. After step S1050, the encoded R picture, the encoded B picture, and the modification identification information are transmitted to the decoder. Moreover, although not illustrated, information on the reference picture generated in step S1030 may be generated in correspondence to the processes of steps S950 and S970 of FIG. 9, and the reference picture information may be transmitted to the decoder.

Figure 11:
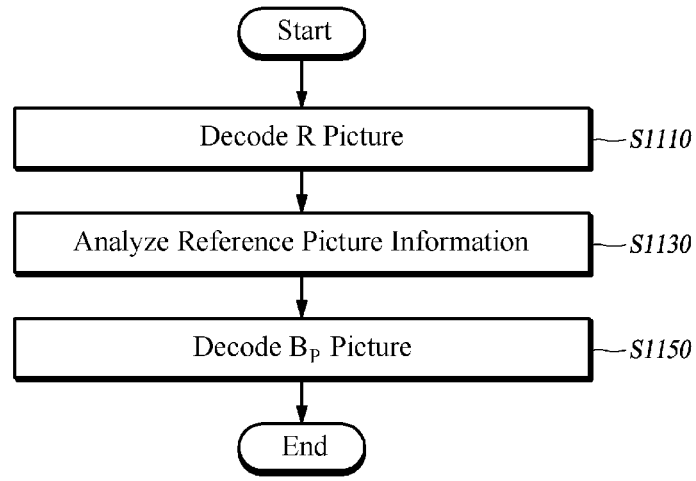
FIG. 11 is a flow chart illustrating a video decoding method using inter-prediction according to at least one third embodiment of the present disclosure.

FIG. 11 is a flow chart illustrating a video decoding method using inter-prediction according to a third embodiment of the present disclosure.

Referring to FIG. 11, R picture as a first picture, which serves as a reference for random access, is decoded (S1110), and reference picture information received from the encoder is analyzed (S1130).

Then, a block included in B picture (for example, BP picture of FIG. 8) as a second picture, which is displayed before the R picture, is inter-prediction decoded by using a plurality of reference pictures, and a process of decoding the block included in the B picture is performed based on the reference picture information representing whether past picture, which is displayed before the B picture, is used as the reference picture for encoding the B picture (S1150).

Figure 12:
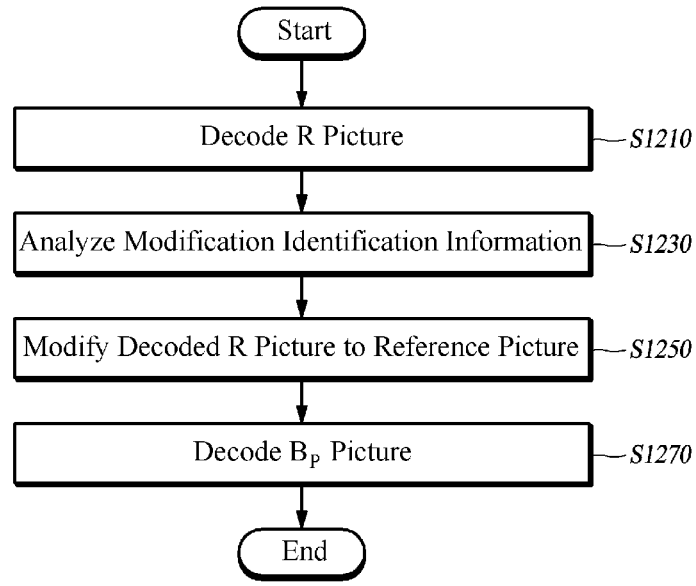
FIG. 12 is a flow chart illustrating a video decoding method using inter-prediction according to at least one fourth embodiment of the present disclosure.

FIG. 12 is a flow chart illustrating a video decoding method using inter-prediction according to a fourth embodiment of the present disclosure.

Referring to FIG. 12, R picture as a first picture, which serves as a reference for random access, is decoded (S1210), and modification identification information representing a modification type of the decoded R picture is analyzed (S1230).

Then, a plurality of reference pictures are generated by modifying the decoded R picture according to the analyzed modification identification information (S1250), and a block included in B picture (for example, BP picture of FIG. 8) as a second picture, which is displayed before the R picture, is inter-prediction decoded by using the plurality of reference pictures (S1270).

Figure 13:
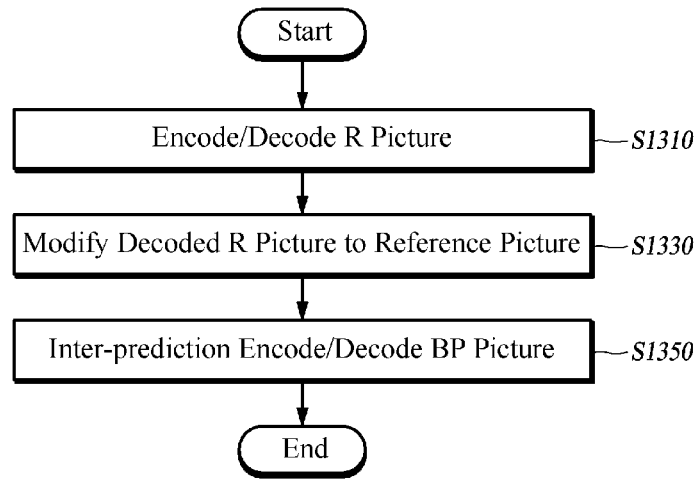
FIG. 13 is a flow chart illustrating an inter-prediction method according to at least one fifth embodiment of the present disclosure.

FIG. 13 is a flow chart illustrating an inter-prediction method according to a fifth embodiment of the present disclosure.

Referring to FIG. 13, R picture as a first picture, which serves as a reference for random access, is encoded or decoded (S1310), and a plurality of reference pictures are generated by modifying the decoded R picture (the R picture encoded in the encoder and then decoded, or the R picture decoded in the decoder) step by step (S1330).

Regarding the process of step S1330, the encoder performs the same process as step S1030 of FIG. 10, and the decoder performs the same process as steps S1230 to S1250.

After encoding or decoding the R picture, a block included in B picture (for example, BP picture of FIG. 8) as a second picture, which is displayed before the R picture, is inter-prediction encoded or decoded (i.e., encoded or decoded in a manner of a inter prediction) by using the plurality of reference pictures (S1350).

Figure 14:
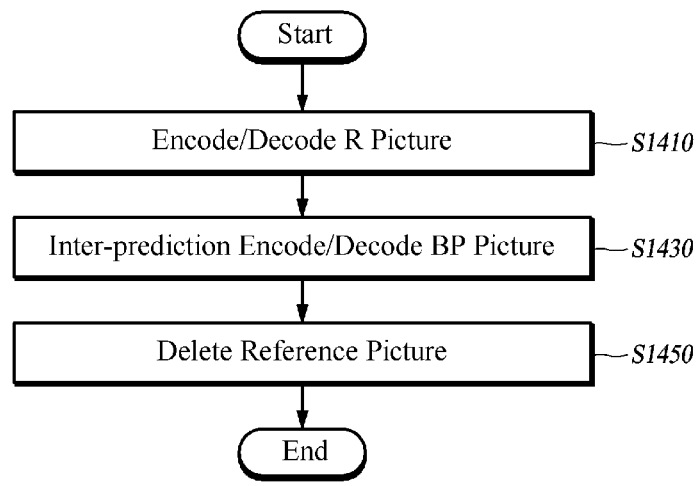
FIG. 14 is a flow chart illustrating an inter-prediction method according to at least one sixth embodiment of the present disclosure.

FIG. 14 is a flow chart illustrating an inter-prediction method according to a sixth embodiment of the present disclosure.

Referring to FIG. 14, R picture as a first picture, which serves as a reference for random access, is encoded or decoded (S1410). After decoding the R picture, a block included in B picture (for example, BP picture of FIG. 8) as a second picture, which is displayed before the R picture, is inter-prediction encoded or decoded (i.e., encoded or decoded in a manner of an inter prediction) by using the plurality of reference pictures (S1430).

Then, in the case of using past reference picture for encoding or decoding the B picture, after the encoding or decoding of the B picture is completed, reference pictures encoded before the encoding of the R picture, again decoded and then stored in a memory or reference pictures decoded before the decoding of the R picture and stored in a memory are deleted (S1450).

Figure 15:
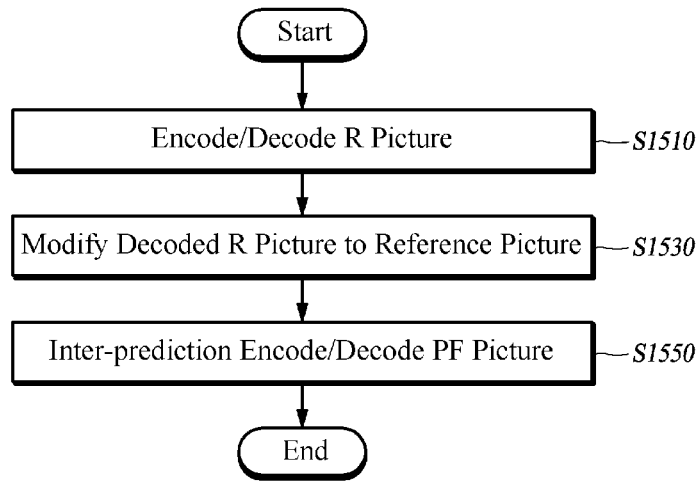
FIG. 15 is a flow chart illustrating an inter-prediction method according to at least one seventh embodiment of the present disclosure.

FIG. 15 is a flow chart illustrating an inter-prediction method according to a seventh embodiment of the present disclosure.

Referring to FIG. 15, R picture as a first picture, which serves as a reference for random access, is encoded or decoded (S1510), and a plurality of reference pictures are generated by modifying the decoded R picture (the R picture encoded in the encoder and then decoded, or the R picture decoded in the decoder) step by step (S1530).

Regarding the process of step S1530, the encoder performs the same process as step S1030 of FIG. 10, and the decoder performs the same process as steps S1230 to S1250.

After encoding or decoding the R picture, a block included in P picture (for example, PP picture of FIG. 8) as a second picture, which is displayed after the R picture, is inter-prediction encoded or decoded by using at least one of the plurality of reference pictures (S1550).

Figure 16:
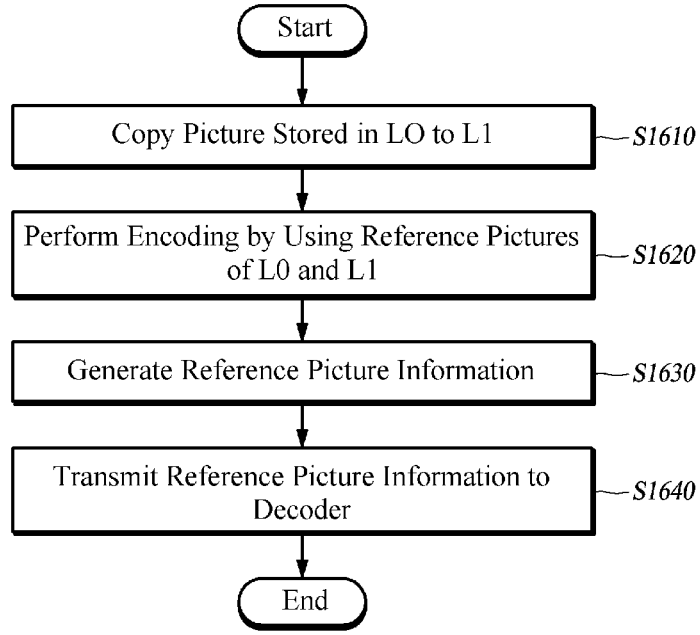
FIG. 16 is a flow chart illustrating a video encoding method using inter-prediction according to at least one eighth embodiment of the present disclosure.

FIG. 16 is a flow chart illustrating a video encoding method using inter-prediction according to an eighth embodiment of the present disclosure. Referring to FIG. 16, after past reference pictures are selected from a memory (list 0 DPB, L0) storing past reference pictures displayed before the current picture, the selected reference pictures are copied to a memory (list 1 DPB, L1) storing future reference pictures displayed after the current picture (S1610). Then, the current picture is prediction-encoded by using the reference pictures stored in the memories L0 and L1 (S1620). In this case, the current picture is B picture.

In next step, reference picture information (for example, syntax of Table 1) used as the reference picture for the encoding of the current picture is generated (S1630). In step S1630, either or both of the past reference picture and the future reference picture may be used for the encoding of the current picture. Then, as described above, the encoded current picture and the reference picture information are transmitted to the decoder (S1640).

Figure 17:
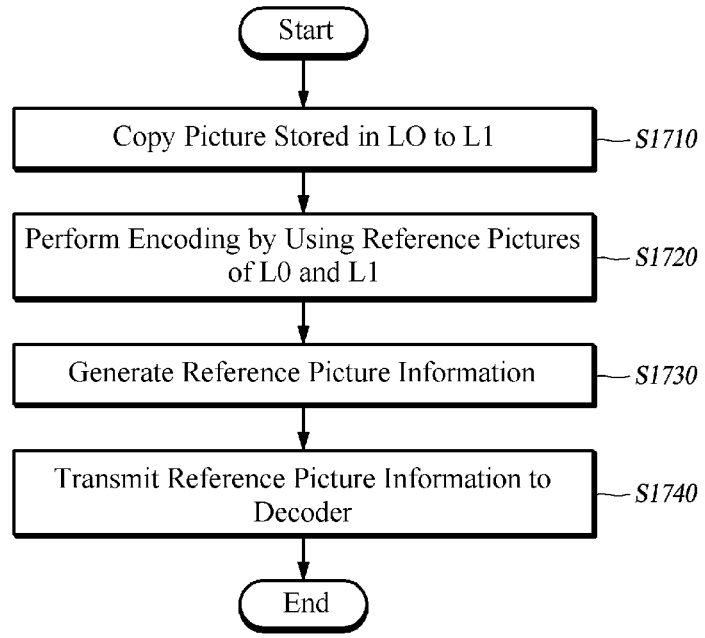
FIG. 17 is a flow chart illustrating a video encoding method using inter-prediction according to at least one ninth embodiment of the present disclosure.

FIG. 17 is a flow chart illustrating a video encoding method using inter-prediction according to a ninth embodiment of the present disclosure. Referring to FIG. 17, after future reference pictures are selected from a memory (list 1 DPB, L1) storing future reference pictures displayed after the current picture, the selected future reference pictures are copied to a memory (list 0 DPB, L0) storing past reference pictures displayed before the current picture (S1710). Then, the current picture is prediction-encoded by using the reference pictures stored in the memories L0 and L1 (S1720). In this case, the current picture is B picture.

In next step, reference picture information (for example, syntax of Table 1) used as the reference picture for the encoding of the current picture is generated (S1730). In step S1730, either or both of the past reference picture and the future reference picture may be used for the encoding of the current picture. Then, as described above, the encoded current picture and the reference picture information are transmitted to the decoder (S1740).

Figure 18:
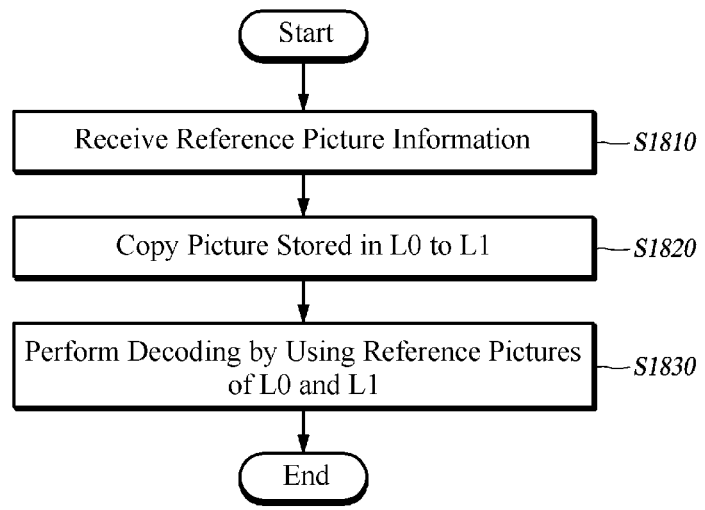
FIG. 18 is a flow chart illustrating a video decoding method using inter-prediction according to at least one tenth embodiment of the present disclosure.

FIG. 18 is a flow chart illustrating a video decoding method using inter-prediction according to a tenth embodiment of the present disclosure. Referring to FIG. 18, a received signal for current picture is decoded (S1810), and reference picture information received from an encoder is analyzed. Then, some pictures are selected from a memory (list 0 DPB, L0) storing past reference pictures displayed before the current picture, and the selected reference pictures are copied to a memory (list 1 DPB, L1) storing future reference pictures displayed after the current picture (S1820). An inter-prediction decoding is performed by using blocks included in the pictures stored in the memories L0 and L1, based on reference picture information representing which picture is used as the reference picture for encoding (S1830).

Figure 19:
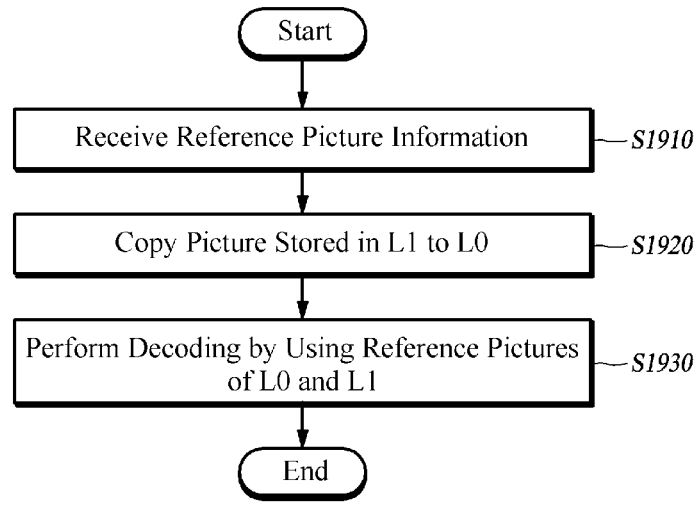
FIG. 19 is a flow chart illustrating a video decoding method using inter-prediction according to at least one eleventh embodiment of the present disclosure.

FIG. 19 is a flow chart illustrating a video decoding method using inter-prediction according to an eleventh embodiment of the present disclosure. Referring to FIG. 19, a received signal for current picture is decoded (S1910), and reference picture information received from an encoder is analyzed. Then, some pictures are selected from a memory (list 1 DPB, L1) storing future reference pictures displayed after the current picture, and the selected reference pictures are copied to a memory (list 0 DPB, L0) storing past reference pictures displayed before the current picture (S1920). An inter-prediction decoding is performed by using blocks included in the pictures stored in the memories L0 and L1, based on reference picture information representing which picture is used as the reference picture for encoding (S1930).

Figure 20:
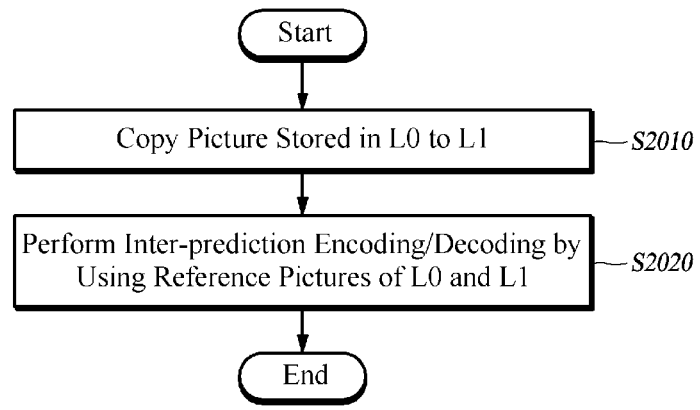
FIG. 20 is a flow chart illustrating an inter-prediction method according to at least one twelfth embodiment of the present disclosure.

FIG. 20 is a flow chart illustrating an inter-prediction method according to a twelfth embodiment of the present disclosure. Referring to FIG. 20, after past reference pictures are selected from a memory (list 0 DPB, L0) storing past reference pictures displayed before the current picture, the selected reference pictures are copied to a memory (list 1 DPB, L1) for the future reference pictures displayed after the current picture (S2010). Then, the current picture is prediction-encoded and prediction-decoded by using the reference pictures stored in the memories L0 and L1 (S2020). In this case, the current picture is P picture or B picture. In step S2020, either or both of the past reference picture and the future reference picture may be used for the encoding and decoding of the current picture.

Figure 21:
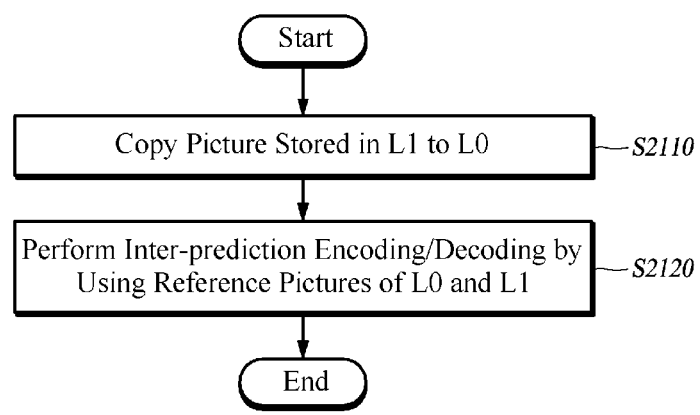
FIG. 21 is a flow chart illustrating an inter-prediction method according to at least one thirteenth embodiment of the present disclosure.

FIG. 21 is a flow chart illustrating an inter-prediction method according to a thirteenth embodiment of the present disclosure. Referring to FIG. 21, after future reference pictures are selected from a memory (list 1 DPB, L1) storing future reference pictures displayed after the current picture, the selected reference pictures are copied to a memory (list 0 DPB, L0) storing past reference pictures displayed before the current picture (S2110). Then, the current picture is prediction-encoded and prediction-decoded by using the reference pictures stored in the memories L0 and L1 (S2120). In this case, the current picture is B picture. In step S2120, either or both of the past reference picture and the future reference picture may be used for the encoding and decoding of the current picture.

Hereinafter, various examples of detailed technologies for implementing the first to thirteenth embodiments of the present disclosure will be described with reference to FIGS. 22 to 27.

According to the embodiment of the present disclosure, R picture or R picture slice header may include a syntax (in this embodiment, referred to as reference picture information and modification identification information) as shown in Table 1 below.

TABLE 1 past_pic_ref_type
if(past_pic_ref_type==1) {
    past_L0_ R_pic_ process_type
}
past_L1_ R_pic_ process_type
fut_L0_R_pic_ process_type The function of the syntax of Table 1 will be described below.

1) past_pic_ref_type past_pic_ref_type is a syntax element that represents whether past reference picture is used for encoding $B_P$ and/or, if used, which past reference picture is used. A value of past_pic_ref_type may be determined in the range of 0 to 2, and the picture affected by the value of past_pic_ref_type is $B_P$. An example of the function of the encoder or the decoder according to the value of past_pic_ref_type determined in the range of 0 to 2 will be described below.

When the value of past_pic_ref_type is 0, the encoder or the decoder uses (decoded) pictures of time point prior to $B_P$, based on display order, as past reference picture (List 0 reference picture) of $B_P$. To this end, when the value of this syntax element is 0, the decoder does not delete the already decoded pictures stored in the DPB, but continuously stores the decoded pictures until a predetermined time point and then deletes the decoded pictures. For example, immediately after decoding all or some of the pictures, whose display order is later than the R picture, among the pictures decoded after the R picture, pictures decoded before the R picture and stored in the DPB may be deleted.

When the value of past_pic_ref_type is 1, the encoder or the decoder deletes the already decoded pictures stored in the DPB, modifies the decoded current R picture, and stores the modified R picture in the DPB so as to use the modified R picture as the past reference picture.

When the value of past_pic_ref_type is 2, the encoder or the decoder deletes the already decoded pictures stored in the DPB. Only pictures (decoded pictures) of time point after BP, based on display order, that is, only the future reference pictures (List 1 reference pictures) of BP, are stored in the DPB so as to use the reference pictures as the reference pictures for encoding or decoding $B_P$.

2) past_L0_R_pic_process_type past_L0_R_pic_process_type is a syntax element that is encoded only when the value of past_pic_ref_type is 1, and represents a method of modifying a decoded current R picture. A value of past_L0_R_pic_process_type may be determined in the range of 0 to 3, and the corresponding picture is $B_P$. An example of the function of the encoder or the decoder according to the value of past_L0_R_pic_process_type determined in the range of 0 to 3 will be described below.

When the value of past_L0_R_pic_process_type is 0, the encoder or the decoder applies a low pass filtering (LPF) process to the decoded current R picture step by step and then uses the LPF-processed R picture as the past reference picture of $B_P$.

When the value of past_L0_R_pic_process_type is 1, the encoder or the decoder applies a zoom-in process to the decoded current R picture step by step and then uses the zoomed-in R picture as the past reference picture of $B_P$.

When the value of past_L0_R_pic_process_type is 2, the encoder or the decoder applies a zoom-out process to the decoded current R picture step by step and then uses the zoomed-out R picture as the past reference picture of $B_P$.

When the value of past_L0_R_pic_process_type is 3, the encoder or the decoder applies a brightness adjustment process to the decoded current R picture step by step and then uses the brightness-adjusted R picture as the past reference picture of $B_P$.

3) past_L1_R_pic_process_type past_L1_R_pic_process_type is a syntax element that represents future reference picture used for encoding or decoding BP. A value of past_L1_R_pic_process_type may be determined in the range of 0 to 4, and the corresponding picture is $B_P$. An example of the function of the encoder or the decoder according to the value of past_L1_R_pic_process_type will be described below.

When the value of past_L1_R_pic_process_type is 0, the encoder or the decoder uses only the decoded current R picture as the future reference picture (List 1 reference picture) of $B_P$, without modifying the R picture.

When the value of past_L1_R_pic_process_type is 1, the encoder or the decoder uses the decoded current R picture and the pictures, which are obtained by applying the LPF process to the decoded current R picture step by step, as the future reference picture of $B_P$.

When the value of past_L1_R_pic_process_type is 2, the encoder or the decoder uses the decoded current R picture and the pictures, which are obtained by applying the zoom-in process to the decoded current R picture step by step, as the future reference picture of $B_P$.

When the value of past_L1_R_pic_process_type is 3, the encoder or the decoder uses the decoded current R picture and the pictures, which are obtained by applying the zoom-out process to the decoded current R picture step by step and, as the future reference picture of $B_P$.

When the value of past_L1_R_pic_process_type is 4, the encoder or the decoder uses the decoded current R picture and the pictures, which are obtained by applying the brightness adjustment process to the decoded current R picture step by step, as the future reference picture of $B_P$.

4) fut_L0_R_pic_process_type fut_L0_R_pic_process_type is a syntax element that represents past reference picture used for encoding or decoding $B_F$ or $P_F$. A value of fut_L0_R_pic_process_type may be determined in the range of 0 to 4, and the corresponding picture is BF. An example of the function of the encoder or the decoder according to the value of fut_L0_R_pic_process_type will be described below.

When the value of fut_L0_R_pic_process_type is 0, the encoder or the decoder uses only the decoded current R picture as the past reference picture of BF or PF, without modifying the R picture.

When the value of fut_L0_R_pic_process_type is 1, the encoder or the decoder uses the decoded current R picture and the pictures, which are modified by applying the LPF process to the decoded current R picture step by step, as the past reference picture of $B_F$ or $P_F$.

When the value of fut_L0_R_pic_process_type is 2, the encoder or the decoder uses the decoded current R picture and the pictures, which are modified by applying the zoom-in process to the decoded current R picture step by step, as the past reference picture of $B_F$ or $P_F$.

When the value of fut_L0_R_pic_process_type is 3, the encoder or the decoder uses the decoded current R picture and the pictures, which are modified by applying the zoom-out process to the decoded current R picture step by step, as the past reference picture of $B_F$ or $P_F$.

When the value of fut_L0_R_pic_process_type is 4, the encoder or the decoder uses the decoded current R picture and the pictures, which are modified by applying the brightness adjustment process to the decoded current R picture step by step, as the past reference picture of $B_F$ or $P_F$.

Various embodiments, including at least the first to thirteenth embodiments of FIGS. 9 to 21, may be implemented by combinations of the above-described syntaxes.

Figure 22:
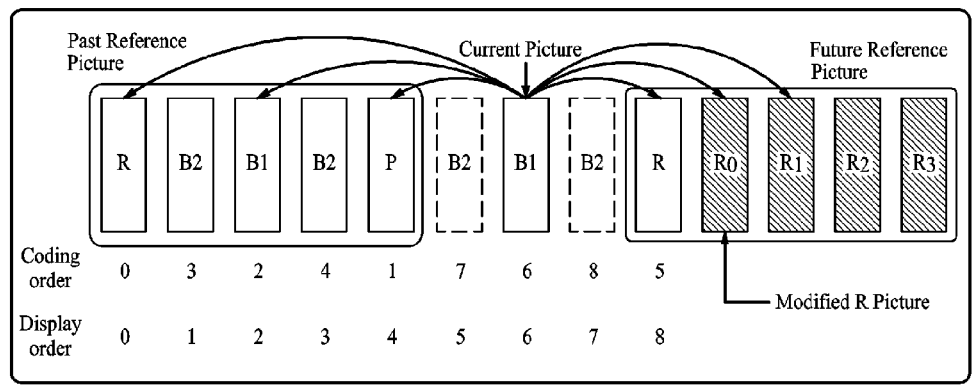
FIG. 22 is a diagram explaining a first example of a syntax combination according to at least one embodiment of the present disclosure.

As one example of the combinations of the above-described syntaxes, when the value of past_pic_ref_type is 0 and the value of past_L1_R_pic_process_type is in the range of 1 to 4, B pictures belonging to BP are encoded or decoded as illustrated in FIG. 22.

Figure 23:
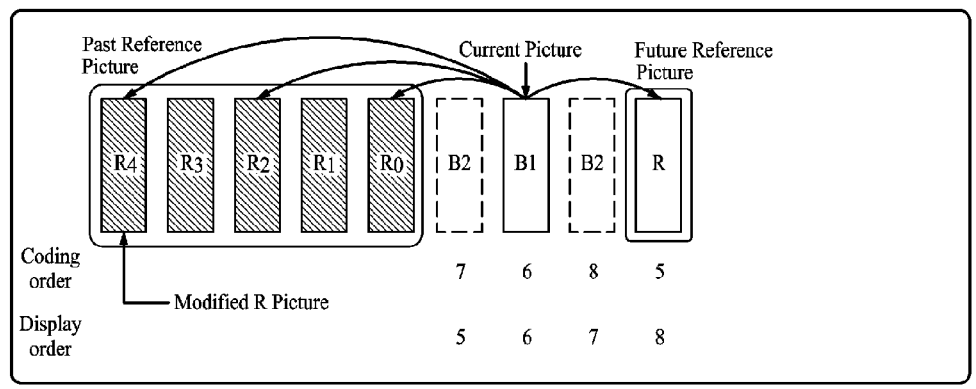
FIG. 23 is a diagram explaining a second example of a syntax combination according to at least one embodiment of the present disclosure.

As another example of the combinations of the above-described syntaxes, when the value of past_pic_ref_type is 1; the value of past_L0_R_pic_process_type is in the range of 0 to 3; and the value of past_L1_R_pic_process_type is 0, pictures belonging to BP are encoded or decoded as illustrated in FIG. 23.

Figure 24:
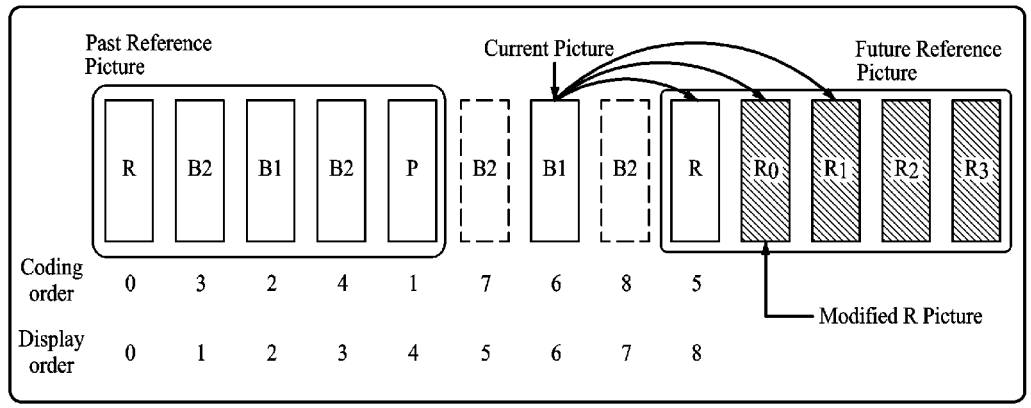
FIG. 24 is a diagram explaining a third example of a syntax combination according to at least one embodiment of the present disclosure.

As yet another example of the combinations of the above-described syntaxes, when the value of past_pic_ref_type is 2 and the value of past_L1_R_pic_process_type is in the range of 1 to 4, B pictures belonging to $B_F$ are encoded or decoded as illustrated in FIG. 24.

Figure 25:
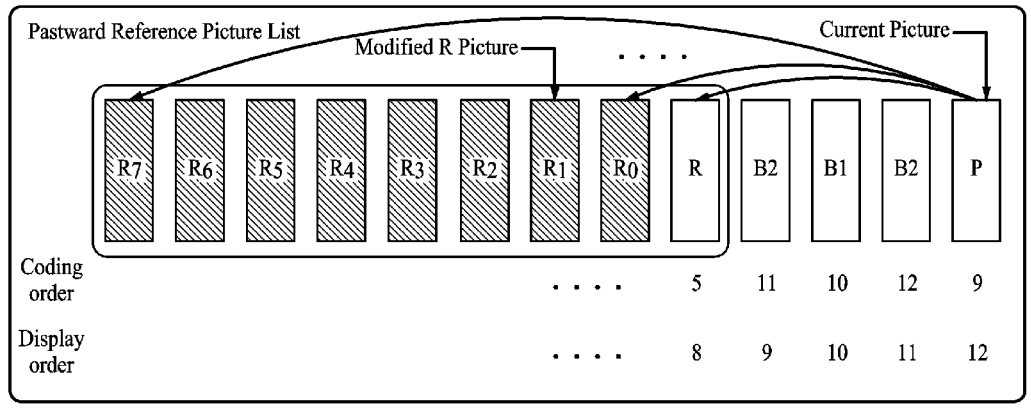
FIG. 25 is a diagram explaining a fourth example of a syntax combination according to at least one embodiment of the present disclosure.

As still another example of the combinations of the above-described syntaxes, when the value of fut_L0_R_pic_process_type is in the range of 1 to 4, B or P pictures belonging to $B_F$ or $P_F$ are encoded or decoded as illustrated in FIG. 25.

The LPF process, the zoom-in process, the zoom-out process, and the brightness adjustment process used in past_L0_R_pic_process_type, past_L1_process_R_pic_type, and fut_L0_R_pic_process_type may be applied step by step according to the temporal distance of display order from the current picture. As the temporal distance of the display order is closer, the modification may be performed with a slight level, and as the temporal distance of the display order is farther, the R modification may be performed with a strong level.

In this case, there is no limitation to the strong-level R picture modification as the distance is closer and the slight-level modification as the distance is farther, depending on the temporal distance of the display order.

According to the above-described embodiment, the encoder and the decoder manage the memory, that is, the DPB, in the same manner. Therefore, by using the same reference pictures stored in the DPB, the encoder encodes each picture and the decoder decodes each picture.

In the above-described embodiment, the encoder selects the values of the syntax elements, such as past_pic_ref_type, past_L0_R_pic_process_type, past_L1_R_pic_process_type or fut_L0_R_pic_process_type, by using an appropriate method, and inserts the syntax elements to the picture header or the slice header of the syntax elements, or other suitable bitstream layer. The decoder parses the syntax elements and performs a relevant operation according to the values of the respective syntax elements.

In the above-described embodiment, new syntax elements for controlling the operation of the decoder have been introduced. However, according to another embodiment of the present disclosure, the above-described problem of the known IDR picture may be solved in a simpler manner by operating the encoder and the decoder in the same manner according to a predefined algorithm, without introduction of the syntax element such as past_pic_ref_type. For example, in the above-described embodiment, various DPB managements can be performed according to the value of past_pic_ref_type. In another embodiment, instead of transmitting past_pic_ref_type, the function corresponding to the case where the value of past_pic_ref_type is 0 may be performed in the same manner by the encoder and the decoder.

In addition, in the embodiment of the present disclosure, although the method of modifying the decoded R picture is designated according to the value of each syntax, the 1:1 correspondence of the value and the corresponding modifying method may be changed according to a predefined rule.

The number of steps of modifying all decoded R pictures may be determined according to the number of reference pictures set by the user.

Although the method of modifying all R pictures has been applied in units of pictures or slices in the embodiments of the present disclosure, there is no limitation to applying the method of modifying the R picture transmitted from the slice header in units of blocks.

Figure 26:
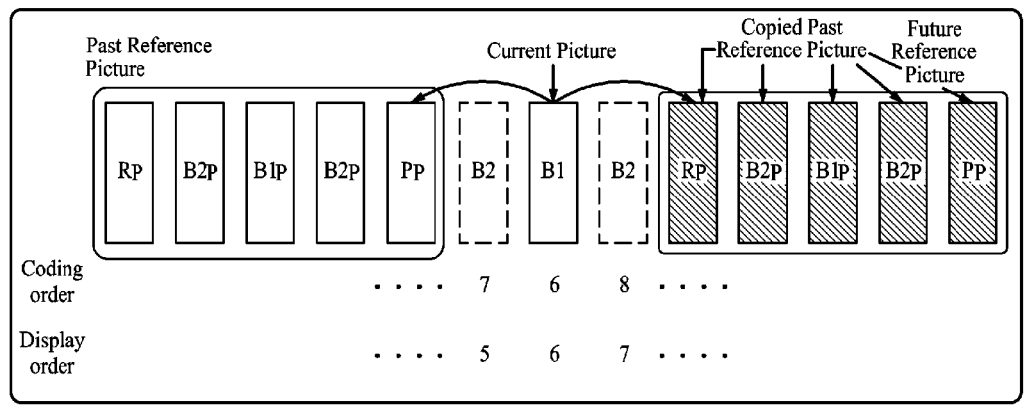
FIG. 26 is a diagram explaining a sixth example of a syntax combination according to at least one embodiment of the present disclosure.

In addition, as illustrated in FIG. 26, when encoding and decoding the current picture B1, a specific frame, all frames or some frames among the past reference pictures R, B2, B1, B2 and P may be copied to a future reference picture buffer, and may be used for prediction encoding and decoding of the current picture B1.

Figure 27:
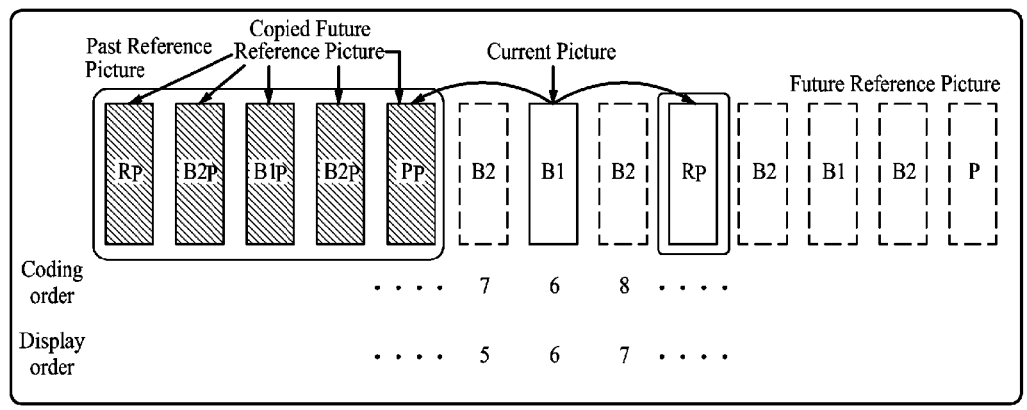
FIG. 27 is a diagram explaining a seventh example of a syntax combination according to at least one embodiment of the present disclosure.

In addition, as illustrated in FIG. 27, when encoding and decoding the current picture B1, a specific frame, all frames or some frames among the future reference pictures may be copied to a past reference picture buffer, and may be used for prediction encoding and decoding of the current picture B1.

According to the embodiment of the present disclosure, in order to use the decoded pictures existing before the BP pictures (in display order) or the modified decoded current R picture as the reference picture of the BP pictures of FIG. 8, the syntax is added to the slice header. However, there is no limitation to encoding the corresponding BP pictures by using only one predefined method.

In addition, when the decoded current R picture is modified and used as the reference picture of BF and PF pictures, the syntax is added to the slice header in order to encode the modifying method. However, there is no limitation to encoding the BF or PF pictures by using only one predefined method.

In addition, in the embodiments of the present disclosure, there is no limitation to a type, size, or order of a filter used for modifying the decoded R picture.

In addition, in the embodiments of the present disclosure, there is no limitation to the zoom-in method and the picture/block interpolation method, which are used for modifying the decoded R picture.

In addition, in the embodiments of the present disclosure, there is no limitation to the zoom-out method and the picture/block interpolation and sampling method, which are used for modifying the decoded R picture.

In addition, in the embodiments of the present disclosure, there is no limitation to the brightness change method and the number of brightness change parameters, which are used for modifying the decoded R picture.

Moreover, in the embodiments of the present disclosure, the decoded current R picture is copied or modified so as to be used for the reference pictures of the BF and PF pictures. However, there is no limitation to the copy or modification of an arbitrary type of the reference picture.

According to various embodiments of the present disclosure as described above, by resetting a DPB immediately before encoding IDR picture, P or B picture after the IDR picture is encoded by using the IDR picture and pictures reconstructed after the IDR picture, without referring to pictures reconstructed before the IDR picture. Therefore, it is possible to solve problems that reduce the encoding efficiency because a smaller number of reference pictures are used as compared to P or B pictures encoded before the IDR picture.

In addition, according to the present disclosure as described above, when the number of reference pictures of specific P or B picture is limited or smaller than the number reference pictures of other P or B pictures, a plurality of reference pictures are additionally provided by copying usable reference pictures and using an arbitrary picture processing method, thereby improving the encoding efficiency.

Moreover, according to the present disclosure as described above, new reference picture generating step and method introduce new syntax elements or equally operate an encoder or a decoder in accordance with a predefined algorithm. Since the encoder and the decoder generate the same reference pictures, the quality of reconstructed pictures generated by the encoder is equal to the quality of decoded pictures generated by the decoder.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary aspects of the present disclosure have not been described for limiting purposes. Accordingly, the scope of the claimed invention is not to be limited by the above aspects but by the claims and the equivalents thereof.

What is claimed is:

1. A video encoding method using inter-prediction, comprising:
    encoding information indicating whether a first picture is a picture which allows a second picture preceding the first picture in a display order to refer to at least one reference picture encoded before the first picture, wherein the first picture serves as a random access picture;
    encoding the first picture without referring to a reference picture which has already encoded;
    when the first picture is a picture which allows the second picture to refer to the at least one reference picture encoded before the first picture,
        inter-prediction encoding, after encoding the first picture, the second picture by using a plurality of reference pictures, and
        encoding reference picture information representing the reference pictures used for encoding the second picture among reference pictures including one or more reference pictures encoded before the first picture, wherein:
            the one or more reference pictures encoded before the first picture are adaptively deleted from a memory based on whether or not the one or more reference pictures encoded before the first picture are used for encoding the second picture, and
            when the one or more reference pictures encoded before the first picture are used as the reference pictures for encoding the second picture, the one or more reference pictures encoded before the first picture are not deleted from the memory until the second picture is encoded; and
    when the first picture is not a picture which allows the second picture to refer to the at least one reference picture encoded before the first picture,
        inter-prediction encoding, after encoding the first picture, the second picture without using the one or more reference pictures encoded before the first picture, wherein the one or more reference pictures encoded before the first picture are deleted from the memory before the first picture is encoded,
    wherein,
        the memory includes a reference picture list 0 into which past reference pictures displayed before the second picture to be encoded are inserted and a reference picture list 1 into which future reference pictures displayed after the second picture to be encoded are inserted, and
        the reference picture list 0 is allowed to include, in addition to the past reference pictures, one or more future reference pictures which are inserted into the reference picture list 1.

2. The video encoding method of claim 1, wherein the memory is a decoded picture buffer.

3. The video encoding method of claim 1, wherein the second picture is bi-directionally inter-predicted.

4. The video encoding method of claim 1, further comprising:
    encoding a third picture following the first picture and the second picture in displaying as well as in encoding.

* * * * *